US007171387B2

(12) United States Patent
Grey et al.

(10) Patent No.: US 7,171,387 B2
(45) Date of Patent: Jan. 30, 2007

(54) METHOD AND APPARATUS FOR CONDUCTING MULTIPLE TRANSACTIONS

(75) Inventors: William Grey, Millwood, NY (US); Clifford A. Pickover, Yorktown Heights, NY (US); Paul A. Moskowitz, Yorktown Heights, NY (US); Dailun H. Shi, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1333 days.

(21) Appl. No.: 09/859,023

(22) Filed: May 15, 2001

(65) Prior Publication Data

US 2002/0174023 A1   Nov. 21, 2002

(51) Int. Cl.
*G06Q 40/00* (2006.01)
(52) U.S. Cl. ...................................................... 705/37
(58) Field of Classification Search ................... 705/37
See application file for complete search history.

(56) References Cited

U.S. PATENT DOCUMENTS

2001/0034663 A1* 10/2001 Teveler et al. ................ 705/26

2002/0052817 A1* 5/2002 Dines et al. .................. 705/36

FOREIGN PATENT DOCUMENTS

WO     WO 00/48109     *   8/2000

* cited by examiner

*Primary Examiner*—Hyung Sough
*Assistant Examiner*—Elda Milef
(74) *Attorney, Agent, or Firm*—Buckley, Maschoff & Talwalkar LLC; Stephen C. Kaufman

(57) ABSTRACT

A system, method, apparatus, and computer program code for conducting or otherwise facilitating a transaction or request involving a product. A transaction or request involving a product is decomposed or broken down into two or more secondary transactions or requests involving the product. Thus, for an initial transaction, a set of two or more secondary transactions is established that take place instead of the initial transaction. A transaction may involve the purchase or sale of a product at one or more marketplaces. If an initial transaction or request can or is to be conducted within a given period, then some or all of the secondary transactions also may occur within the given time period. Some or all of the secondary transactions or requests may be conducted at the same marketplace or at different marketplaces.

1 Claim, 10 Drawing Sheets

| MARKETPLACE IDENTIFER 502 | MARKETPLACE NAME/ DESCRIPTION 504 | MARKETPLACE COMMUNICATION INFORMATION 506 |
|---|---|---|
| M-123456 | HARDWARE ONLINE SHOWCASE | E-MAIL MESSAGE TO SELLER@HOS.ORG |
| M-791867 | TED'S DISCOUNT WAREHOUSE | FTP TRANSMISSION TO FTP.TEDSDISCOUNT.COM |
| M-865654 | THE PRODUCT EXCHANGE | XML FEED |

FIG. 9

METHOD AND APPARATUS FOR CONDUCTING MULTIPLE TRANSACTIONS

CROSS-REFERENCE TO RELATED PATENT APPLICATIONS

This patent application is related to co-pending patent application entitled Method and Apparatus for Establishing Multiple Transactions to Fulfill a Requirement Involving a Product, which has application Ser. No. 09/858,167 and was filed on May 15, 2001, and to co-pending patent application entitled Method and Apparatus for Conducting a Transaction, which has application Ser. No. 09/855,475 and was filed on May 15, 2001, both of which are incorporated herein by reference.

FIELD OF THE INVENTION

The present invention relates to a method and apparatus for conducting or otherwise facilitating a transaction and, more particularly, embodiments of the present invention relate to methods, apparatus, and computer program code for allocating a transaction among a number of secondary transactions.

BACKGROUND OF THE INVENTION

Companies or people often engage in transactions involving a purchase or sale of large quantities of products. Unfortunately, such transactions may have a significant market impact on the price of the product and may be easy for the media, industry watchers, or alert competitors to detect and monitor. A large purchase or sale of a product often significantly increases or decreases market price for the product because of the additional significant demand or supply for the product imposed on the market. In addition, a large transaction conducted at a single marketplace or with a single supplier, seller, purchaser etc. may limit or reduce options regarding negotiation, price, delivery, shipping, etc.

It would be advantageous to provide a method and apparatus that overcame the drawbacks of the prior art and allow companies or people to conduct transactions that mitigate the impact on supply, demand, and price for a product resulting from large volume purchases or sales of the product. In particular, it would be desirable to provide a method and apparatus for reducing the market impact of any one transaction involving a product and to allow flexibility regarding the purchase and sale of a large volume of the product.

SUMMARY OF THE INVENTION

Embodiments of the present invention provide a system, method, apparatus, and computer program code for conducting or otherwise facilitating a transaction or request involving a product. According to embodiments of the present invention, a transaction or request is decomposed or broken down into two or more secondary transactions or requests. Thus, for an initial transaction or request, a group of two or more secondary transactions or requests is established that take place instead of the initial transaction. A transaction or request may involve the purchase or sale of a product at one or more marketplaces. If an initial transaction or request is to be conducted within a given period, then some or of the secondary transactions also may occur within the given time period. Some or all of the secondary transactions or requests may be conducted at the same marketplace or at different marketplaces. By breaking down or decomposing an initial transaction or request into two or more secondary transactions or requests, market impact of the initial transaction or request might be reduced and the smaller secondary transactions may go unnoticed.

Additional objects, advantages, and novel features of the invention shall be set forth in part in the description that follows, and in part will become apparent to those skilled in the art upon examination of the following or may be learned by the practice of the invention.

According to embodiments of the present invention, a method for facilitating a transaction includes receiving data indicative of an initial transaction involving a product that can occur within a time period; associating a plurality of secondary transactions with the initial transaction, wherein each of the secondary transactions can occur within the time period; and providing data indicative of at least one of the secondary transactions. In another embodiment, a method for facilitating a transaction includes receiving a notification of an initial request to purchase a first quantity of a product during a designated time period; determining a plurality of secondary requests to purchase respective quantities of the product, wherein a total of the respective quantities of the product involved in all of the plurality of secondary requests equals the first quantity; and providing a notification regarding at least one of the secondary requests. In a further embodiment, a method for facilitating a transaction includes receiving a notification of an initial request to sell a first quantity of a product during a designated time period; determining a plurality of secondary requests to purchase respective quantities of the product, wherein a total of the respective quantities of the product involved in all of the plurality of secondary requests equals the first quantity; and providing a notification regarding at least one of the secondary requests. In yet another embodiment, a method for facilitating a transaction includes determining an initial transaction for a quantity of a product; associating a plurality of secondary transactions with the initial transaction; and providing data indicative of at least one of the secondary transactions. In a further embodiment, a method for facilitating a transaction includes providing data indicative of an initial transaction involving a product that can occur within a predetermined time period; receiving a notification of a plurality of secondary transactions associated with the initial transaction, wherein each of the secondary transactions can occur within the time period; and conducting at least one of the secondary transactions. In a still further embodiment, a method for facilitating a transaction includes receiving data indicative of an initial transaction involving a product that can occur within a predetermined time period; determining a plurality of secondary transactions associated with the initial transaction, wherein each of the secondary transactions can occur within the time period; and conducting at least one of the secondary transactions.

According to one embodiment of the present invention, a system for facilitating a transaction includes a memory; a communication port; and a processor connected to the memory and the communication port, the processor being operative to: determine an initial transaction for a quantity of a product; associate a plurality of secondary transactions with the initial transaction; and provide data indicative of at least one of the secondary transactions. In another embodiment, the processor may be operative to receive a notification of an initial request to purchase a first quantity of a product during a designated time period; determine a plurality of secondary requests to purchase respective quantities of the product, wherein a total of the respective quantities of the product involved in all of the plurality of secondary requests equals the first quantity; and provide a notification regarding at least one of the secondary requests. In a further embodiment, the process may be operative to receive a notification of an initial request to sell a first quantity of a product during a designated time period; determine a plurality of secondary requests to purchase respective quantities of the product, wherein a total of the respective quantities of the product involved in all of the plurality of secondary requests equals the first quantity; and provide a notification regarding at least one of the secondary requests. In yet another embodiment, the processor may be operative to determine an initial transaction for a quantity of a product; associate a plurality of secondary transactions with the initial transaction; and provide data indicative of at least one of the secondary transactions. In a further embodiment, the processor may be operative to provide data indicative of an initial transaction involving a product that can occur within a predetermined time period; receive a notification of a plurality of secondary transactions associated with the initial transaction, wherein each of the secondary transactions can occur within the time period; and conduct at least one of the secondary transactions. In a still further embodiment, the processor may be operative to receive data indicative of an initial transaction involving a product that can occur within a predetermined time period; determine a plurality of secondary transactions associated with the initial transaction, wherein each of the secondary transactions can occur within the time period; and conduct at least one of the secondary transactions.

According to one embodiment of the present invention, an apparatus for facilitating a transaction includes means for obtaining data indicative of an initial transaction involving a product that can occur within a time period; means for establishing a plurality of secondary transactions with the initial transaction, wherein each of the secondary transactions can occur within the time period; and means for sending data indicative of at least one of the secondary transactions. In another embodiment, an apparatus for facilitating a transaction includes means for obtaining a notification of an initial request to purchase a first quantity of a product during a designated time period; means for establishing a plurality of secondary requests to purchase respective quantities of the product, wherein a total of the respective quantities of the product involved in all of the plurality of secondary requests equals the first quantity; and means for sending a notification regarding at least one of the secondary requests. In a further embodiment, an apparatus for facilitating a transaction includes means for obtaining a notification of an initial request to sell a first quantity of a product during a designated time period; means for establishing plurality of secondary requests to purchase respective quantities of the product, wherein a total of the respective quantities of the product involved in all of the plurality of secondary requests equals the first quantity; and means for sending a notification regarding at least one of the secondary requests. In yet another embodiment, an apparatus for facilitating a transaction includes means for identifying an initial transaction for a quantity of a product; means for establishing a plurality of secondary transactions with the initial transaction; and means for sending data indicative of at least one of the secondary transactions. In a further embodiment, an apparatus for facilitating a transaction includes means for sending data indicative of an initial transaction involving a product that can occur within a predetermined time period; means for obtaining a notification of a plurality of secondary transactions associated with the initial transaction, wherein each of the secondary transactions can occur within the time period; and means for transacting at least one of the secondary transactions. In a still further embodiment, an apparatus for facilitating a transaction includes means for obtaining data indicative of an initial transaction involving a product that can occur within a predetermined time period; means for establishing a plurality of secondary transactions associated with the initial transaction, wherein each of the secondary transactions can occur within the time period; and means for transacting at least one of the secondary transactions.

According to one embodiment of the present invention, a computer program product in a computer readable medium for facilitating a transaction includes first instructions for identifying an initial transaction for a quantity of a product; second instructions for establishing a plurality of secondary transactions associated with the initial transaction; and third instructions for sending data indicative of at least one of the secondary transactions. In another embodiment, a computer program product in a computer readable medium for facilitating a transaction includes first instructions for obtaining a notification of an initial request to purchase a first quantity of a product during a designated time period; second instructions for establishing a plurality of secondary requests to purchase respective quantities of the product, wherein a total of the respective quantities of the product involved in all of the plurality of secondary requests equals the first quantity; and third instructions for sending a notification regarding at least one of the secondary requests. In a further embodiment, a computer program product in a computer readable medium for facilitating a transaction includes first instructions for obtaining a notification of an initial request to sell a first quantity of a product during a designated time period; second instructions for establishing plurality of secondary requests to purchase respective quantities of the product, wherein a total of the respective quantities of the product involved in all of the plurality of secondary requests equals the first quantity; and third instructions for sending a notification regarding at least one of the secondary requests. In yet another embodiment, a computer program product in a computer readable medium for facilitating a transaction includes first instructions for identifying an initial transaction for a quantity of a product; second instructions for establishing a plurality of secondary transactions with the initial transaction; and third instructions for sending data indicative of at least one of the secondary transactions. In a further embodiment, a computer program product in a computer readable medium for facilitating a transaction includes first instructions for sending data indicative of an initial transaction involving a product that can occur within a predetermined time period; second instructions for obtaining a notification of a plurality of secondary transactions associated with the initial transaction, wherein each of the secondary transactions can occur within the time period; and third instructions for transacting at least one of the secondary transactions. In a still further embodiment, a computer program product in a computer readable medium for facilitating a transaction includes first instructions for obtaining data indicative of an initial transaction involving a product that can occur within a predetermined time period; second instructions for establishing a plurality of secondary transactions associated with the initial transaction, wherein each of the secondary transactions can occur within the time period; and third instructions for transacting at least one of the secondary transactions.

With these and other advantages and features of the invention that can become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

FIG. 9 is an illustration of a representative marketplace database of FIG. 5.

DETAILED DESCRIPTION

Applicants have recognized that there is a need for systems and methods that allow a transaction or request to be broken down into, or associated with, two or more secondary transactions or requests that take place instead of the initial transaction or request. The initial transaction or request may involve the purchase or sale of a product (e.g., chemical, food product, semiconductor or electronic component) at one or more marketplaces. As used herein, the term "product" includes any intangible or tangible good as well as any kind of service. Thus, the secondary transactions will also involve the purchase or sale of the product. In some embodiments, the initial transaction or request may be required to occur within a specific time period. Thus, some or all of the secondary transactions or requests also may occur within the same time period. The secondary transactions may occur at different marketplaces and/or at different times. In some of the embodiments, a product involved in a transaction or request may be a non-financial product. These and other features will be discussed in further detail below, by describing a system, individual devices, and processes according to embodiments of the invention. As one example of how the methods of the present invention might be used, a single contract between a buyer and a single seller to purchase one thousand bolts might be broken down into six contracts, three of which involve the buyer purchasing two hundred of the bolts, one of which involves the buyer purchasing one hundred of the bolts, and the remaining two contracts each involving the purchase of one hundred and fifty of the bolts. Instead of conducting the first contract with a single seller, the buyer instead may have six contracts with six different sellers or conduct the six purchases through six different marketplaces.

Process Description

Figure 1:
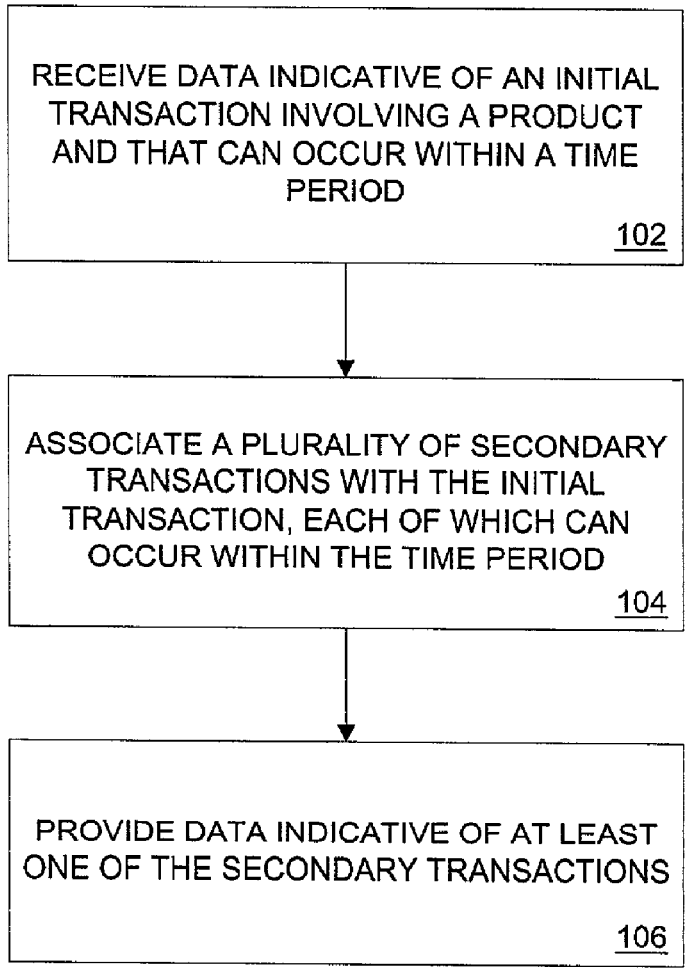
FIG. 1 is a flowchart of a first embodiment of a method in accordance with the present invention.

Reference is now made to FIG. 1, where a flow chart 100 is shown which represents the operation of a first embodiment of the present invention. The particular arrangement of elements in the flow chart 100 is not meant to imply a fixed order to the steps; embodiments of the present invention can be practiced in any order that is practicable. In some embodiments, some or all of the steps of the method 100 may be performed by a server or other device on behalf of one or more entities.

Processing begins at a step 102 during which a server or other device receives data indicative of an initial transaction occurring, or planned or expected to occur, or that can occur, within a specific time period and involving a product. The data may be received from a marketplace, an entity involved or participating in the initial transaction (e.g., a buyer, seller, supplier, distributor, etc.) or a device associated with the entity or marketplace. For example, a person or company desiring to buy a certain quantity of a product (e.g., rice, cars, memory chips, televisions) may send or otherwise provide the data received during the step 102. Alternatively, the information received during the step 102 may come from a marketplace to be involved in the sale or purchase of a product of the initial transaction. The data received during the step 102 may be received in any format or form, including, but not limited to, HTTP (Hypertext Transfer Protocol), HTML (Hypertext Mark-up Language) or FTP (File Transfer Protocol) transmission, XML (Extensible Mark-up Language) feed, email message, instant message communication, facsimile transmission, telephone call, electronic signal or communication, etc., and may come from any type of device, such as a server or user device (e.g., computer, cellular telephone). Information regarding an entity might be stored in, or accessed from, an entity information database.

The initial transaction indicated in the data received during the step 102 may involve purchasing or selling a quantity of the indicated product within the indicated time period; placing an order for a quantity of the indicated product within the indicated time period; placing a bid on the indicated product within the indicated time period; reserving a quantity of the indicated product, etc. The initial transaction indicated in the data received during the step 102 may involve a contract that has been established for the transaction between one or more entities. For example, the initial transaction may involve or include a futures, forward, swap, option or other contract to purchase or sell the indicated product during the indicated time period, a contract with a buyer, seller, supplier, marketplace, etc. regarding the indicated product, etc.

The time period specified in the data received during the step 102 may be a specific time and/or date upon which the indicated transaction is to occur or a range of time during which the initial transaction is to occur. For example, the data received during the step 102 may indicate that an initial transaction is to occur on Oct. 12, 2001, on Oct. 12, 2001, at 4:00 pm, or between Oct. 1, 2001, and Oct. 15, 2001.

The data received during the step 102 may include information regarding the indicated product involved in the initial transaction. For example, the data received during the step 102 may include a product identifier, a name or description for the indicated product, a desired price or quantity of the indicated product, a delivery, packaging, payment or shipping term involved in the transaction or with the indicated product, the name or identifier of a party or entity involved in the transaction, a desired list of sellers, buyers, suppliers, etc. for the indicated product, etc. Information regarding one or more products might be stored in, or accessed from, a product information database.

In some embodiments, receiving data indicative of an initial transaction involving a product may include one or more of the following: receiving information regarding a total price associated with the initial transaction; receiving information regarding a marketplace where the product is available; receiving information regarding delivery of the product; receiving an identifier (e.g., code, name) associated with the initial transaction or an entity involved in the initial transaction; receiving an identifier associated with the product, etc.

In some embodiments receiving data indicative of an initial transaction also may include receiving data indicative of a condition associated with a marketplace or the transaction that must be satisfied before the transaction can occur or before any transaction can take place at the marketplace or with a particular entity (e.g., seller, buyer, distributor, shipper) involved in the transaction. For example, a condition might be or include a requirement that a specific marketplace provide, or that the initial transaction involve, a minimum or maximum price for the indicated product; a designated price for the indicated product; a minimum or maximum order for the indicated product; a payment, credit, shipping, inventory, delivery, or lead time requirement; a requirement that the identified product be produced by one or more members of a set of designated producers; a requirement that the identified product not be produced by one or more members of a set of designated producers; a quality requirement; a performance requirement; a service level requirement; etc. In some embodiments of the method 100, the method 100 may include a step of determining a condition associated with the indicated initial transaction, a marketplace where the initial transaction might occur, or an entity involved in the initial transaction.

During a step 104, the initial transaction indicated in the data received during the step 102 is broken down, decomposed or otherwise deconstructed into or allocated among two or more secondary transactions for the indicated product, each of which will occur within the time frame or period indicated in the data received during the step 102. Thus, two or more secondary transactions are associated with the initial transaction indicated in the data received during the step 102. In some embodiments, the step 104 may be conducted or completed in accordance with one or more rules, heuristics, formulas, expert systems, optimization models, algorithms, etc. One or more of the rules, heuristics, formulas, expert systems, optimization models, algorithms, etc. may consider such factors as taxes, financial reporting requirements, costs, profits, revenues, hedge effectiveness, required flexibility, lead time variability, market volatility, historical and/or recent transaction or trading volumes, projected market or industry impact, actions by other entities, transportation costs, duties, inventory carrying costs, inventory shrinkage, insurances costs or risks, etc.

In general, the secondary transactions determined during the step 104 may occur at different times at different marketplaces and involve different numbers, volumes, amounts or quantities of the indicated product and/or different entities (e.g., buyers, sellers, suppliers). The result of all of the secondary transactions is to have completed or reached the result of the initial transaction, albeit potentially spread out over time among a plurality of marketplaces and different secondary transactions.

In some embodiments, a single initial transaction may be broken down into multiple secondary transactions that each occur at the same marketplace. In other embodiments, a single initial transaction may be broken down into multiple secondary transactions, some or all of which occur at different marketplaces. A marketplace may be or include any kind of "brick and mortar" marketplace or exchange, such as a store, private or public exchange, warehouse, flea market, auction house, etc. and/or any kind of online marketplace, such as an auction oriented Web site (e.g., www.ebay.com), bulletin board, exchange, product supplier (e.g., www.amazon.com), etc. A marketplace might include any person, company or other entity that allows a purchaser and a seller to negotiate or conduct a transaction. A marketplace might be a buy-side marketplace, a sell-side marketplace, or a two-sided marketplace. Information regarding one or more marketplaces might be stored in, or accessed from, a marketplace information database.

There are many factors that might be taken into account when associating two or more secondary transactions with an initial transaction. Thus, in some embodiments, the step 104 may include one or more of the following: determining market volatility for the indicated product; determining market impact of the initial transaction; determining market impact of at least one of the secondary transactions; determining a group of marketplaces, wherein each of the of secondary transactions can occur at at least one of the group of marketplaces; determining current availability of the indicated product during a time period or at one or more marketplaces; determining a number, amount or other quantity of the indicated product involved in the initial transaction and allocating it among the secondary transactions; etc. Such factors may make one marketplace more desirable for a secondary transaction over a different marketplace or cause a secondary transaction to occur at a specific time or during a specific time period. Information regarding an initial transaction and/or one or more of the secondary transactions associated with the initial transaction might be stored in, or accessed from, a transaction information database.

In some embodiments, associating two or more secondary transactions with an initial transaction may include allocating a desired total or quantity of the indicated product among the secondary transactions, the allocation being based on one or more of the following: prices and availability for the indicated product at one or more marketplaces; minimum or maximum price or order requirements for the product; anticipated market impact of a transaction on the market price of a product at a marketplace; delivery, shipping, or packaging requirements for the indicated product; tax consequences or financial reporting implications of purchasing or selling the indicated product at a marketplace; legal restrictions involved in purchasing or selling the indicated product at a marketplace; financial transaction or payment requirements for purchasing or selling the indicated product at a marketplace; an exchange rate requirement; etc.

Each of the secondary transactions determined during the step 104 or otherwise associated with the initial transaction during the step 104 may involve purchasing or selling a quantity of the indicated product within the indicated time period; placing an order for a quantity of the indicated product within the indicated time period; placing a bid on the indicated product within the indicated time period; reserving a quantity of the indicated product, etc. A secondary transaction determined or otherwise associated during the step 104 may involve or include a futures, forward, swap, option or other contract to purchase or sell the indicated product during the indicated time period, an option contract on a futures, forward, or swap contract to purchase or sell a portion of the quantity of the product, a contract with a buyer, seller, supplier, marketplace, etc. regarding the indicated product, etc. Thus, the step 104 may include entering into or establishing a futures, forward, swap, option or other contract to purchase or sell the indicated product at one or more marketplaces. In some embodiments, the step 104 or the method 100 may include canceling or stopping the initial transaction, providing a notification of cancellation of the initial transaction, or instructing another device or entity to cancel or stop the initial transaction.

In some embodiments, the step 104 may include determining a fee for determining the secondary transactions associated with the initial transaction or for associating one or more of the secondary transactions with the initial transaction. The fee may be based on one or more of the following: the amount of time needed to conduct one or more of the steps of the method 100; the amount of time needed to conduct the initial transaction or one or more of the secondary transactions; the cost of completing one or more of the steps of the method 100; the cost of completing the initial transaction or one or more of the secondary transactions; the type or nature of the initial transaction; a previously agreed upon amount or service level; a fixed fee for transactions occurring over a designated time period; the number of the secondary transactions; a number of marketplaces or entities involved in the secondary transactions; a marketplace or entity involved in at least one of the secondary transactions; a quantity of the indicated product involved in the initial transaction; a quantity of the indicated product involved in at least one of the secondary transactions; the length or the time period during which the secondary transactions will be conducted; the total transactional value or volume of the initial transaction; the total transactional value or volume of the secondary transactions; a designated fraction of estimated savings obtained; etc. In some embodiments, the method 100 might include a step during which a notification of the fee is provided to an entity or marketplace involved in the initial transaction, one or more of the secondary transactions, etc. or the fee may be charged to one or more of the entities. In some embodiments, the method 100 also may include a step of receiving an authorization, or a notification or other data indicative of an authorization to complete the step 104 (or any other step in the method 100) based on the fee.

During a step 106, data indicative of at least one of the secondary transactions is provided to one or more of the entities (e.g., buyers, sellers, marketplaces) involved in one or more of the secondary transactions. The data provided during the step 106 may be provided in any format or form, including, but not limited to, HTTP, HTML or FTP transmission, Web page or bulletin board display, XML feed, email message, facsimile transmission, instant message communication, telephone call, electronic signal or communication, etc.

In some embodiments, providing data during the step 106 indicative of at least one of the secondary transactions may include one or more of the following: placing an order at a plurality of marketplaces for each respective one of the secondary transactions; providing data indicative of the plurality of secondary transactions over a predetermined period of time; providing data indicative of an authorization to conduct at least one of the secondary transactions; providing a name, description or identifier associated with the indicated product; providing an identifier associated with one or more of the secondary transactions or an entity or marketplace involved in one or more of the secondary transactions; providing an identifier associated with the initial transaction; providing data indicative of the initial transaction; providing data indicative of the plurality of secondary transactions to a respective plurality of marketplaces; providing data indicative of a first of the plurality of secondary transactions to a first marketplace and/or a first entity and data indicative of a second of the plurality of secondary transactions to a second marketplace and/or a second entity, etc. In some embodiments, the step 106 may include providing data indicative of one or more futures, forward, swap, option or other contract required or established as part of one or more of the secondary transactions, or entered into, as part of the step 104.

In some embodiments, the method 100 may include a step of conducting one or more of the secondary transactions and/or the step of sending or otherwise providing a notification or other data indicative of a cancellation of the initial transaction.

Figure 2:
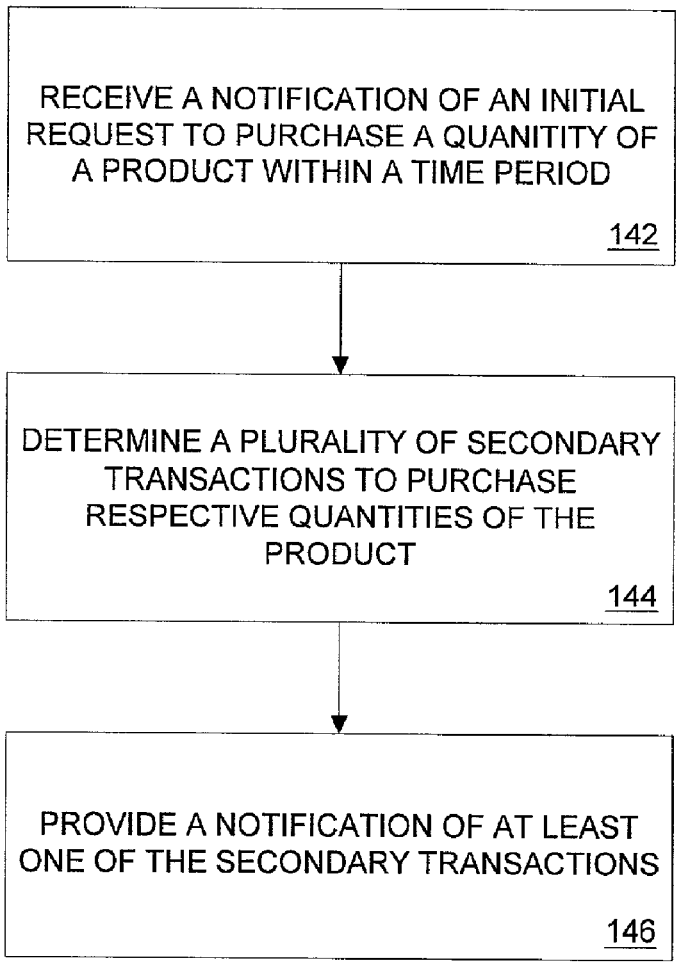
FIG. 2 is a flowchart of a second embodiment of a method in accordance with the present invention.

Reference is now made to FIG. 2, where a flow chart 140 is shown which represents the operation of a second embodiment of the present invention. The particular arrangement of elements in the flow chart 140 is not meant to imply a fixed order to the steps; embodiments of the present invention can be practiced in any order that is practicable. In some embodiments, some or all of the steps of the method 140 may be performed by a server or other device on behalf of one or more entities. While the method 140 focuses on purchasing a quantity of a product, a similar method may be used for selling, reserving, ordering, bidding on, etc. a quantity of a product.

Processing begins at a step 142 during which a notification of an initial request to purchase a quantity of a product within a time frame is received. The step 142 is similar to the step 102 previously discussed above. The request may be received in any form or format and may be part of an email message, FTP, HTML or HTTP transmission, XML feed, Web page or bulletin board display, facsimile transmission, instant message communication, other electronic signal or communication, etc. The request may be received directly or indirectly from an entity making or otherwise involved in or with the request. For example, a company that wants to purchase a quantity of a product within a certain time frame or period might send out the request received during the step 142. As another example, a distributor of the product may want to find sources for the product within a certain time frame.

The request received during the step 142 may include information regarding the indicated product. For example, the request may include a product identifier, a name or description of the product, a desired price or quantity of the indicated product, a delivery, packaging, payment or shipping term involved with the request or with the indicated product, the name or identifier of a party, marketplace or entity involved with the request, a desired list of sellers, buyers, suppliers, etc. for the indicated product, information regarding current or future availability of the product at one or more marketplaces, a condition associated with the product, time frame or request, etc. Information regarding one or more products might be stored in, or accessed from, a product information database. The step 142 may include receiving information regarding a total price associated with the request or the product, availability of the product at a given marketplace, delivery, shipping or packaging of the product, etc. In some embodiments, the request indicated during the step 142 may be, include or relate to a futures, forward, swap or option contract to purchase or sell the indicated product during the indicated time period, a contract with a buyer, seller, supplier, marketplace, etc. regarding the indicated product, etc.

During a step 144, a plurality of secondary requests to purchase quantities of the product are determined. The step 144 is similar to the step 104 previously discussed above. The step 144 may include determining availability of the product at one or more marketplaces; determining availability of the product during the time period; determining if some or all of the secondary requests can occur within the time period; etc.

In some embodiments, associating two or more secondary requests with an initial request may include allocating a desired quantity of the indicated product among the secondary requests, the allocation being based on one or more of the following: prices and availability for the indicated product at a plurality of marketplaces; minimum or maximum price or order requirements; delivery, shipping, or packaging requirements for the indicated product; tax consequences or financial reporting implications of purchasing or selling the indicated product at a marketplace; legal restrictions involved in purchasing or selling the indicated product at a marketplace; financial transaction terms associated with purchasing or selling the indicated product at a marketplace; etc.

Each of the secondary requests determined during the step 144 or otherwise associated with the initial request during the step 144 may involve purchasing or selling a quantity of the indicated product within the indicated time period; placing an order for a quantity of the indicated product within the indicated time period; placing a bid on the indicated product within the indicated time period; reserving a quantity of the indicated product, etc. In some embodiments, the step 144 or the method 140 may include entering into or establishing a futures, forward, swap or option contract to purchase or sell the indicated product during the indicated time period, a contract with a buyer, seller, supplier, marketplace, etc. regarding the indicated product, etc.

During a step 146, a notification of one or more of the secondary requests is provided to an entity, device, marketplace, etc. involved or associated with one or more of the secondary requests. The step 146 is similar to the step 106 previously discussed above. The notification may be or include an HTTP, HTML or FTP transmission, Web page display, XML feed, instant message communication, email message, facsimile transmission, telephone call, electronic signal or communication, etc. The notification provided during the step 146 may be in any form or format.

In some embodiments, providing a notification during the step 106 of at least one of the secondary requests may include one or more of the following: placing an order at a plurality of marketplaces for the product; providing data indicative of the plurality of secondary requests over a predetermined period of time; providing data indicative of an authorization to conduct at least one of the secondary requests; providing a description or identifier associated with the indicated product; providing an identifier associated with one or more of the secondary requests; providing an identifier associated with the initial request; providing data indicative of the initial request and/or one of secondary requests to a respective plurality of marketplaces; providing data indicative of a first of the secondary requests to a first marketplace and/or a first entity and data indicative of a second of the secondary requests to a second marketplace and/or a second entity, etc. In some embodiments, the step 146 may include providing data indicative of one or more futures, forward, swap, option or other contract required or established as part of the step 144.

In some embodiments, the method 140 may include a step of determining a fee for completing all or part of the method 140. The fee may be based on one or more factors, including, but not limited to, the amount of time needed to conduct one or more of the steps of the method 140, the amount of time needed to conduct the initial request or one or more of the secondary requests, the cost of completing one or more of the steps of the method 140, the cost of completing the initial request or one or more of the secondary requests, the type of initial request, a previously agreed upon amount or service level, a fixed fee for requests or transactions occurring over a designated time period, the number of secondary requests, the number of marketplaces or entities involved in the secondary requests, the quantities of the product in the initial request and/or one or more of the secondary requests, the time period, the total transactional value of the initial request or one or more of the secondary requests, a designated fraction of cost savings obtained, etc. In addition, the method 140 may include a step of sending a notification of the fee to an entity involved in a request, a marketplace involved in a request, etc. In some embodiments, the method also may include a step of receiving authorization to proceed after the notification regarding the fee has been provided. In some embodiments, the method 140 may include conducting one or more of the secondary requests or authorizing a completion of one or more of the secondary requests.

Figure 3:
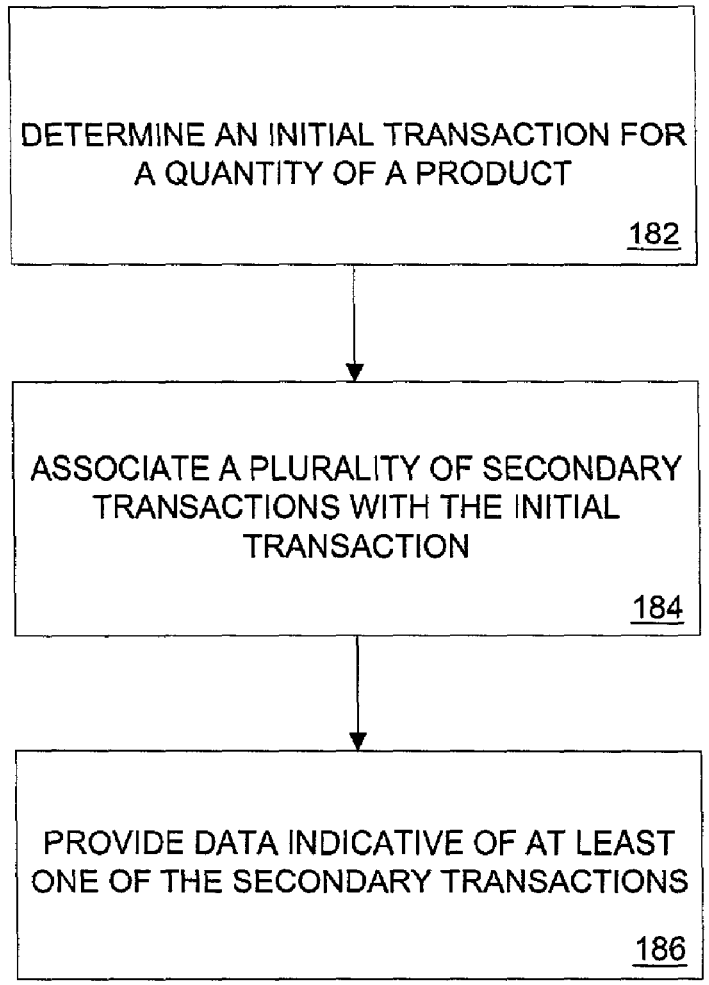
FIG. 3 is a flowchart of a third embodiment of a method in accordance with the present invention.

Reference is now made to FIG. 3, where a flow chart 180 is shown which represents the operation of a third embodiment of the present invention. The particular arrangement of elements in the flow chart 180 is not meant to imply a fixed order to the steps; embodiments of the present invention can be practiced in any order that is practicable. In some embodiments, some or all of the steps of the method 180 may be performed by a server or other device on behalf of one or more entities.

Processing begins at a step 182 during which an initial transaction for a quantity of a product is determined. In some embodiments, the initial transaction may occur within a predetermined or specific time frame. The initial transaction may involve or include a futures, forward, swap, option or other contract to purchase or sell the indicated product during the indicated time period, a contract with a buyer, seller, supplier, marketplace, etc. regarding the indicated product, etc.

In some embodiments, the step 182 may be or include one or more of the following: determining a need to purchase or sell the quantity of the product within a time period; receiving data indicative of a requirement for a quantity of the product; receiving information regarding a total price associated with the product; receiving information regarding a marketplace where the product is or will be available; receiving information regarding a marketplace where the product can be purchased and/or sold; receiving information regarding delivery, shipping or payment of the product; receiving an identifier associated with the product or the initial transaction, etc. In some embodiments, a server or other device implementing the method 180 may receive information from an entity or marketplace involved or to be involved in the initial transaction.

During a step 184, two or more secondary transactions are associated with the initial transaction. The step 184 is similar to the step 104 previously discussed above. In embodiments where the initial transaction must occur within a designated time frame, some or all of the secondary transactions may have to occur within the same time frame.

A secondary transaction determined or otherwise associated during the step 184 may involve or include a futures, forward, swap, option or other contract to purchase or sell the indicated product during the indicated time period, a contract with a buyer, seller, supplier, marketplace, etc. regarding the indicated product, etc. Thus, the step 184 may include entering into or establishing a futures, forward, swap, option or other contract to purchase or sell the indicated product at one or more marketplaces. In some embodiments, the step 184 or the method 180 may included canceling the initial transaction, providing a notification of cancellation of the initial transaction, or instructing another device or entity to cancel the initial transaction.

During a step 186, data is provided indicative of at least one of the secondary transactions to one or more entities, devices, or marketplaces involved with or participating in one or more of the secondary transactions. The step 186 is similar to the step 106 previously discussed above. The step 186 may include one or more of the following: entering into or establishing a futures, forward, swap, option or other contract to purchase or sell a portion of the quantity of the product; entering into a contract with at least one seller or purchaser of the product; entering into a first contract with a first party to sell or purchase a first portion of the quantity of the product and into a second contract with a second party to sell or purchase a second portion of the quantity of the product; placing an order at a plurality of marketplaces for each of the secondary transactions; providing data indicative of one or more of the secondary transactions over a predetermined period of time; providing data indicative of an authorization to conduct at least one of the secondary transactions; providing an identifier associated with the product, one of the secondary transactions, the initial transaction, a marketplace and/or an entity involved in one or more of the secondary transactions; providing data indicative of a first of the secondary transactions to a first marketplace or a first entity and data indicative of a second of the secondary transactions to a second marketplace or a second entity; etc.

Other embodiments of the present invention are also possible, including, but not limited to a method for facilitating a transaction that includes providing data indicative of an initial transaction involving a product that will occur within a predetermined time period; receiving a notification of a plurality of secondary transactions associated with the initial transaction, wherein each of the secondary transactions can occur within the time period; and conducting or authorizing at least one of the secondary transactions. As another example embodiment, a method for facilitating a transaction includes receiving data indicative of an initial transaction involving a product that will occur within a predetermined time period; determining a plurality of secondary transactions associated with the initial transaction, wherein each of the secondary transactions can occur within the time period; and conducting or authorizing at least one of the secondary transactions.

System

Figure 4:
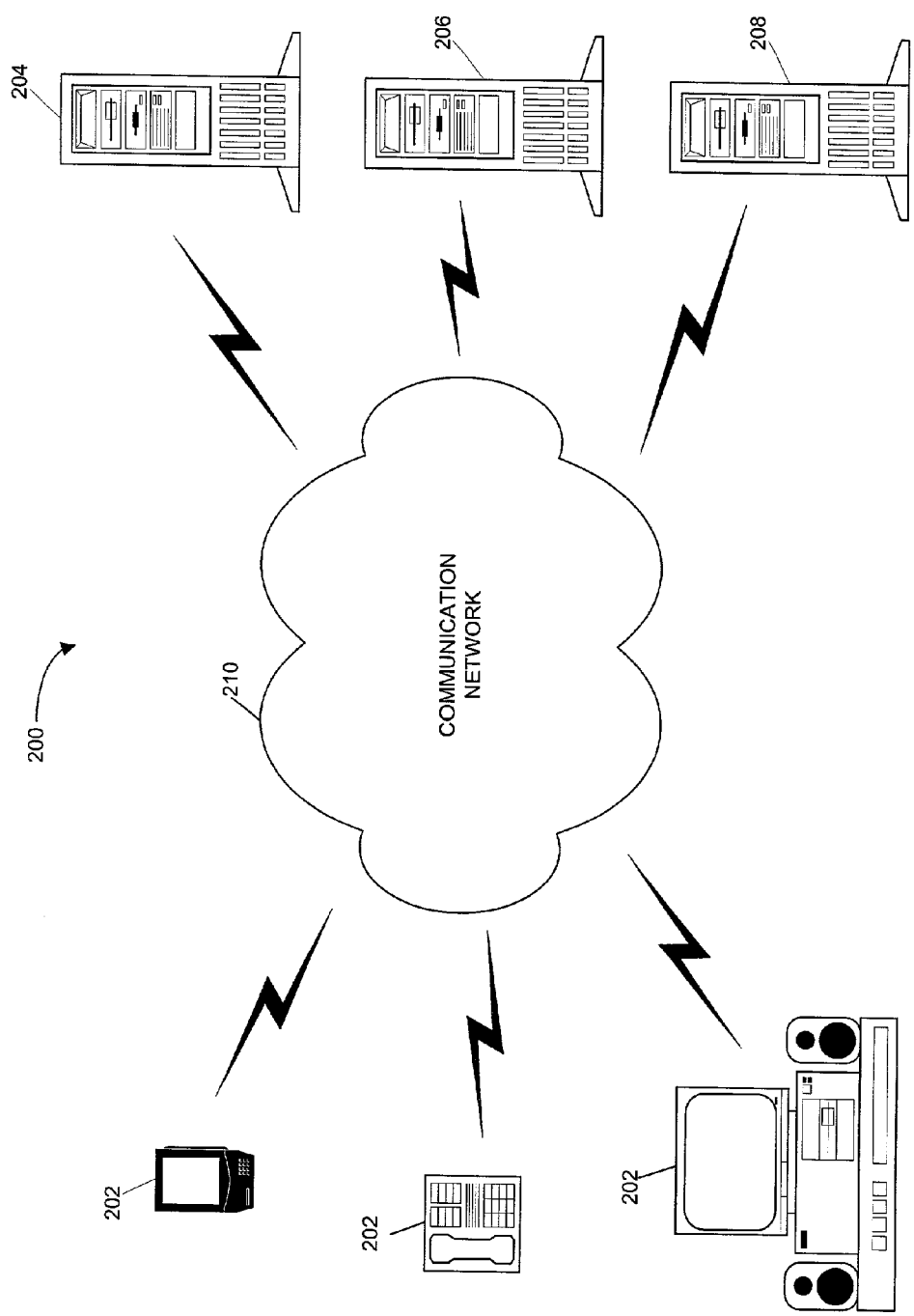
FIG. 4 is a block diagram of system components for an embodiment of an apparatus usable with the methods of FIGS. 1–3.

Now referring to FIG. 4, an apparatus or system 200 usable with the methods 100, 140, 180 is illustrated. The apparatus 200 includes one or more user or client devices 202 that may communicate directly or indirectly with one or more servers, controllers or other devices 204, 206, 208 via a computer, data, or communications network 210. For purposes of further explanation and elaboration of the methods disclosed above, the methods will be assumed to be operating on, or under the control of, the server 204.

A server 204, 206, 208 may implement or host a Web site. A server 204, 206, 208 can comprise a single device or computer, a networked set or group of devices or computers, a workstation, etc. In some embodiments, a server 204, 206, 208 also may function as a database server and/or as a user device. In general, a server might implement one or more of the steps of the methods disclosed above and provide notifications or data to a server or other device associated with a marketplace. For example, the server 204 may implement the steps 102, 104, 106 of the method 100 and provide, during the step 106, data indicative of a first secondary transaction to the server 206 and data indicative of a second secondary transaction to the server 208. The servers 206, 208 may be associated with or used by different marketplaces, suppliers, purchasers, etc. The data received by the server 204 during the step 102 may be received from one of the user devices 202 or one of the other servers. The use, configuration and operation of servers will be discussed in more detail below.

The user devices 202 preferably allow entities to interact with each other and/or the servers 204, 206, 208 and the remainder of the apparatus 200. The user devices 202 also may enable a user to access Web sites, software, databases, etc. hosted or operated by the servers 204, 206, 208. If desired, the user devices 202 also may be connected to or otherwise in communication with other devices. Possible user devices include a personal computer, portable computer, mobile or fixed user station, workstation, network terminal or server, cellular telephone, kiosk, dumb terminal, personal digital assistant, two-way pager, etc.

Many different types of implementations or hardware configurations can be used in the system 200 and with the methods disclosed herein and the methods disclosed herein are not limited to any specific hardware configuration for the system 200 or any of its components.

The communications network 210 might be or include the Internet, the World Wide Web, or some other public or private computer, cable, telephone or communications network or intranet, as will be described in further detail below. The communications network 210 illustrated in FIG. 4 is only meant to be generally representative of cable, computer, telephone or other communication networks for purposes of elaboration and explanation of the present invention and other devices, networks, etc. may be connected to the communications network 210 without departing from the scope of the present invention. The communications network 210 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 204 without departing from the scope of the present invention. Moreover, as used herein, communications include those enabled by wired or wireless technology.

In some embodiments, a suitable wireless communication network 210 may include the use of Bluetooth technology, allowing a wide range of computing and telecommunication devices to be interconnected via wireless connections. Specifications and other information regarding Bluetooth technology are available at the Bluetooth Internet site www-.bluetooth.com. In embodiments utilizing Bluetooth technology, some or all of the devices of FIG. 4 may be equipped with a microchip transceiver that transmits and receives in a previously unused frequency band of 2.45 GHz that is available globally (with some variation of bandwidth in different countries). In addition to data, up to three voice channels are available. Connections can be point-to-point or multipoint over a current maximum range of ten (10) meters. Embodiments using Bluetooth technology may require the additional use of one or more receiving stations to receive and forward data from individual user devices 202 or servers 204, 206, 208.

Although three user devices 202 and three servers 204, 206, 208 are shown in FIG. 4 any number of such devices may be included in the system 200. The devices shown in FIG. 4 need not be in constant communication. For example, a user device may communicate with a server only when such communication is appropriate or necessary.

Server

Figure 5:
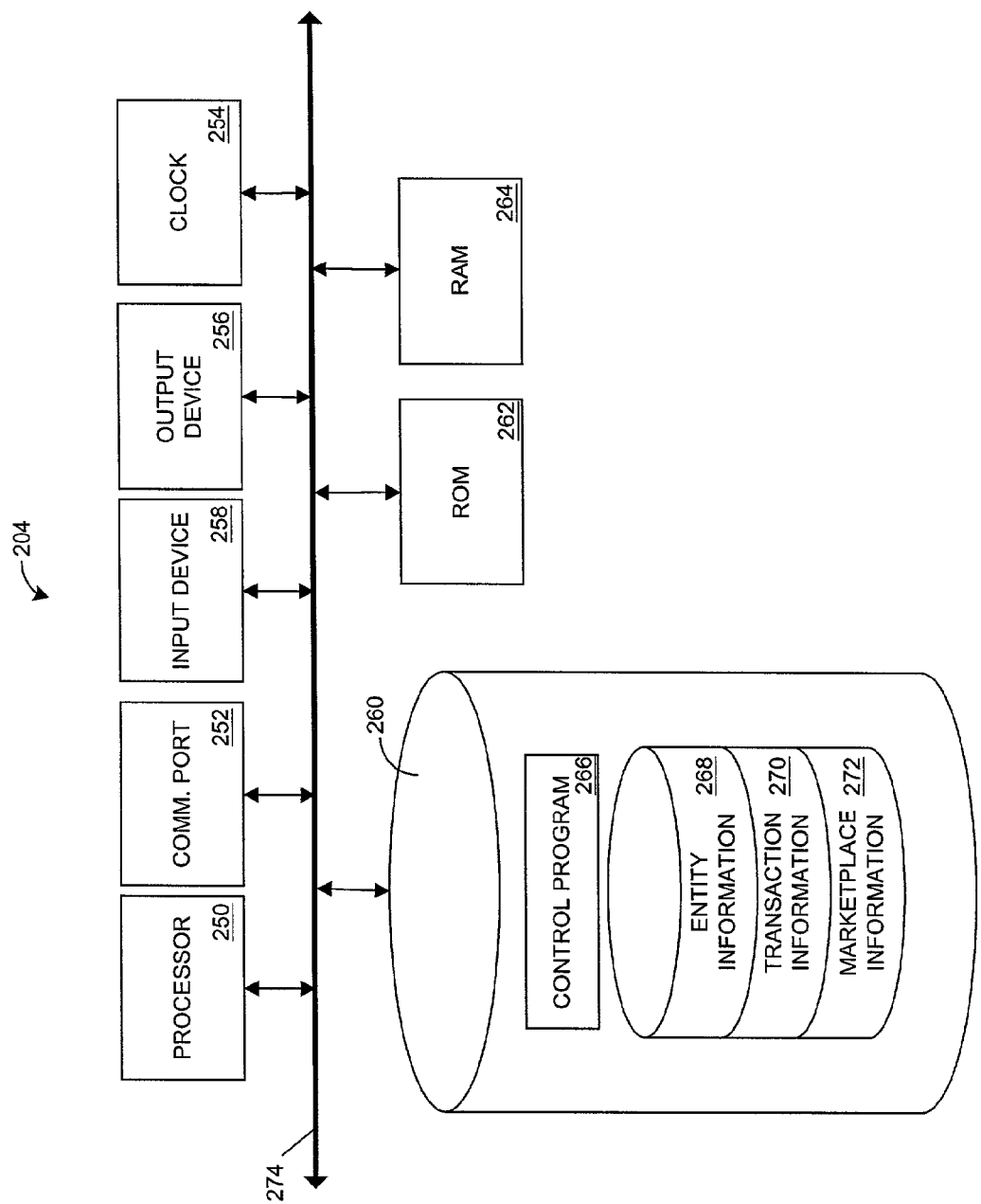
FIG. 5 is a block diagram of a representative server of FIG. 4.

Now referring to FIG. 5, a representative block diagram of a server or controller 204 is illustrated. The server 204 may include a processor, microchip, central processing unit, or computer 250 that is in communication with or otherwise uses or includes one or more communication ports 252 for communicating with user devices and/or other devices. Communication ports may include such things as local area network adapters, wireless communication devices, Bluetooth technology, etc. The server 204 also may include an internal clock element 254 to maintain an accurate time and date for the server 204, create time stamps for communications received or sent by the server 204, etc.

If desired, the server 204 may include one or more output devices 256 such as a printer, infrared or other transmitter, antenna, audio speaker, display screen or monitor, text to speech converter, etc., as well as one or more input devices 258 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 204 may include a memory or data storage device 260 to store information, software, databases, communications, device drivers, etc. The memory or data storage device 260 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The server 204 also may include separate ROM 262 and RAM 264.

The processor 250 and the data storage device 260 in the server 204 may each be, for example: (i) located entirely within a single computer or other computing device; or (ii) connected to each other by a remote communication medium, such as a serial port cable, telephone line or radio frequency transceiver. In one embodiment, the server 204 may comprise one or more computers that are connected to a remote server computer for maintaining databases.

A conventional personal computer or workstation with sufficient memory and processing capability may be used as the server 204. In one embodiment, the server 204 operates as or includes a Web server for an Internet environment. The server 204 preferably is capable of high volume transaction processing, performing a significant number of mathematical calculations in processing communications and database searches. A Pentium™ microprocessor such as the Pentium III™ microprocessor, manufactured by Intel Corporation may be used for the processor 250. Equivalent processors are available from Motorola, Inc., AMD, or Sun Microsystems, Inc. The processor 250 also may comprise one or more microprocessors, computers, computer systems, etc.

Software may be resident and operating or operational on the server 204. The software may be stored on the data storage device 260 and may include a control program 266 for operating the server, databases, etc. The control program 266 may control the processor 250. The processor 250 preferably performs instructions of the control program 266, and thereby operates in accordance with the present invention, and particularly in accordance with the methods described in detail herein. The control program 266 may be stored in a compressed, uncompiled and/or encrypted format. The control program 266 furthermore includes program elements that may be necessary, such as an operating system, a database management system and device drivers for allowing the processor 250 to interface with peripheral devices, databases, etc. Appropriate program elements are known to those skilled in the art, and need not be described in detail herein.

The server 204 also may include or store information regarding users, communications, entities, transactions, products, marketplaces, requests, etc. For example, information regarding one or more entities may be stored in an entity database 268 for use by the server 204 or another device or entity, information regarding one or more transactions or requests may be stored in a transaction database 270 for use by the server 204 or another device or entity, and information regarding one or more marketplaces may be stored in a marketplace database 272 for use by the server 204 or another device or entity. The server 204 also may store, access or use a product database for storing information regarding one or more products.

According to an embodiment of the present invention, the instructions of the control program may be read into a main memory from another computer-readable medium, such as from the ROM 262 to the RAM 264. Execution of sequences of the instructions in the control program causes the processor 250 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 250, communication port 252, clock 254, output device 256, input device 258, data storage device 260, ROM 262, and RAM 264 may communicate or be connected directly or indirectly in a variety of ways. For example, the processor 250, communication port 252, clock 254, output device 256, input device 258, data storage device 260, ROM 262, and RAM 264 may be connected via a bus 274.

While specific implementations and hardware configurations for servers 204 devices have been illustrated, it should be noted that other implementations and hardware configurations are possible and that no specific implementation or hardware configuration is needed. Thus, not all of the components illustrated in FIG. 5 may be needed for a server implementing the methods disclosed herein. Therefore, many different types of implementations or hardware configurations can be used in the system 200 and the methods disclosed herein are not limited to any specific hardware configuration.

User Device

As mentioned above, user device 202 may be or include any of a number of different types of devices, including, but not limited to a personal computer, portable computer, mobile or fixed user station, workstation, network terminal or server, telephone, beeper, kiosk, dumb terminal, personal digital assistant, facsimile machine, two-way pager, radio, cable set-top box, cash register, etc. If desired, the user device 202 also may function as a server 204. In some embodiments, a user device 202 may have the same structure or configuration as the server 204 illustrated in FIG. 5 and include some or all of the components of the server 204. In some embodiments, an entity or marketplace may use a user device to provide information regarding an initial transaction or request and receive information regarding one or more secondary transactions or requests.

Databases

As previously discussed above, in some embodiments a server, user device, or other device may include or access an entity database for storing or keeping information regarding one or more entities that might conduct a transaction or participate in a transaction. One representative entity database 300 is illustrated in FIG. 6.

The entity database 300 may include an entity identifier field 302 that may include codes or other identifiers for one or more entities, an entity description field 304 that may include names, descriptions and other information associated with the entities identified in the field 302, and an associated transactions field 306 that may include codes or other identifiers for transactions associated with the entities identified in the field 302. Other or different fields also may be used in the entity database 300. For example, the entity database 300 may include fields containing address or other contact information for the entities identified in the field 302 and/or fields containing information regarding the interests, demographics, preferences, etc. of the entities identified in the field 302.

Figure 6:
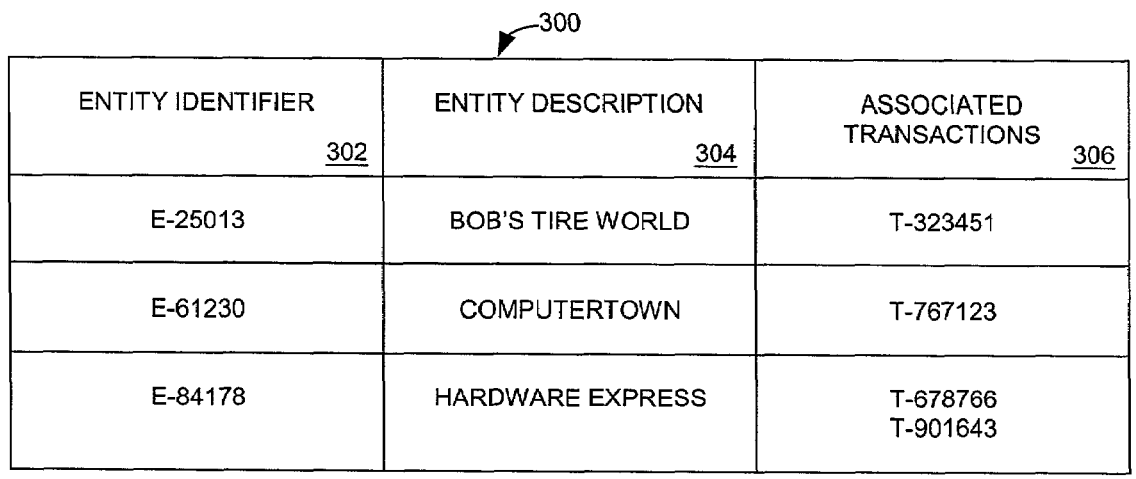
FIG. 6 is an illustration of a representative entity information database of FIG. 5.

As illustrated in the representative entity database 300 of FIG. 6, the entity identified as "E-25013" in the field 302 is named "BOB'S TIRE WORLD" and has conducted, or at least been involved in, the initial transaction identified as "T-323451". Information regarding transactions may be found in a transaction database, as will be discussed in more detail below.

As previously discussed above, in some embodiments a server, user device, or other device may include or access a transactions database for storing or keeping information about one or more transactions. One representative transactions database 400 is illustrated in FIG. 7.

The transaction database 400 may include a transaction identifier field 402 that may include codes or other identifiers for one or more transactions, a product identifier field 404 that may include codes or other identifiers involved in the transactions identified in the field 402, a transaction time period field 406 that may indicate when the transactions identified in the field 402 are supposed to occur, and a secondary transaction identifier field 408 which may include codes or other identifiers for one or more secondary transactions associated with the transactions identified in the field 402. Other or different fields also may be used in the transaction database 400. For example, the transaction database 400 may include a field identifying one or more entities and/or marketplaces involved in each transaction identified in the field 402.

Figure 7:
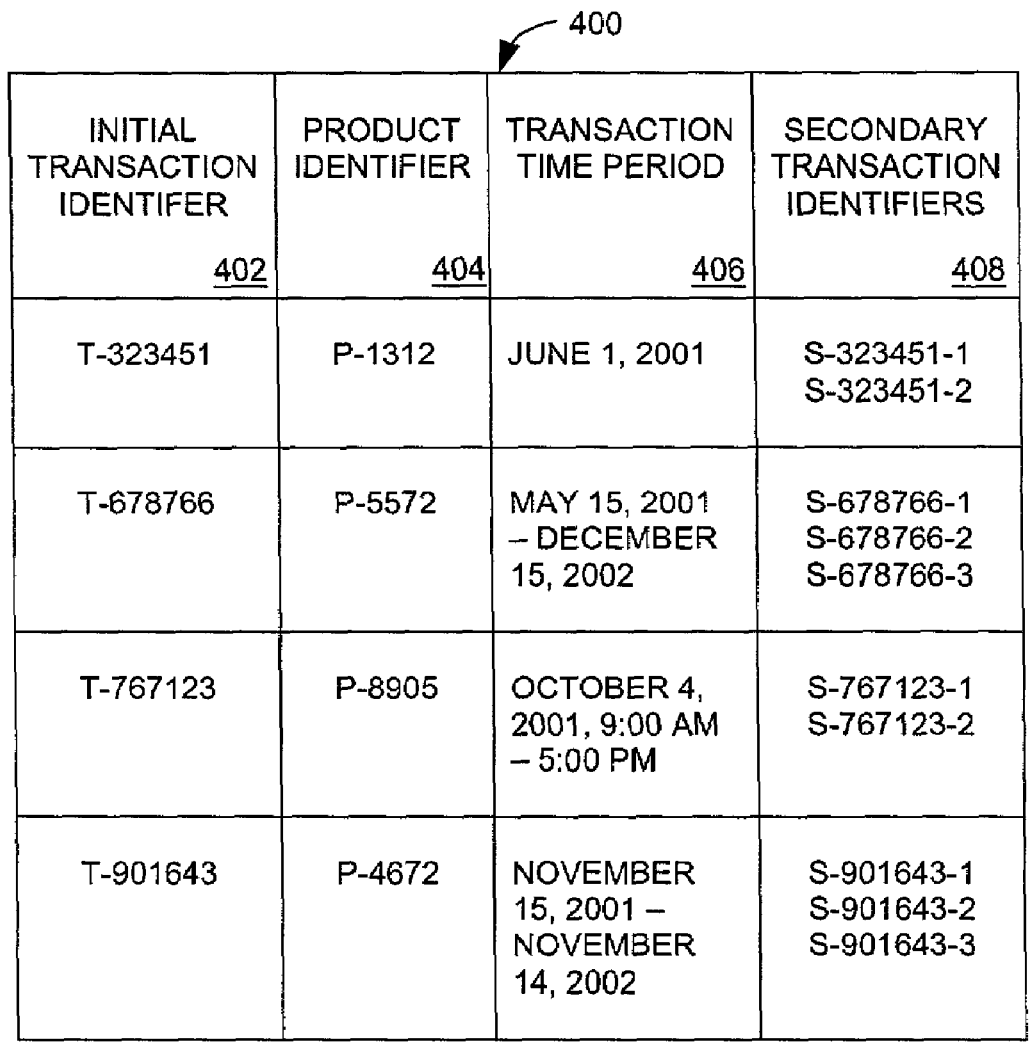
FIG. 7 is an illustration of a representative transaction database of FIG. 5.

As illustrated in the representative transaction database 400 of FIG. 7, the initial transaction identified as "T-323451" in the field 402 involves the product identified as "P-1312" and is to take place on Jun. 1, 2001. Two secondary transactions identified as "S-323451-1" and "S-323451-2" have been associated with the initial transaction "T-1323451" as indicated by the entries in the field 408. Information regarding the product identified as "P-1312" may be found in a product database. Presumably the two secondary transactions identified as "S-323451-1" and "S-323451-2" will occur instead of the initial transaction identified as "T-323451".

The initial transaction identified as "T-587766" in the field 402 involves the product identified as "P-7723" and is to take place between Jul. 1, 2001, and Dec. 1, 2001. Three secondary transactions identified as "S-587766-1", "S-587766-2" and "S-587766-3" have been associated with the initial transaction "T-678766" as indicated by the entries in the field 408. Presumably the three secondary transactions identified as "S-678766-1", "S-678766-2" and "S-678766-3" will occur instead of the initial transaction identified as "T-678766".

Figure 8:
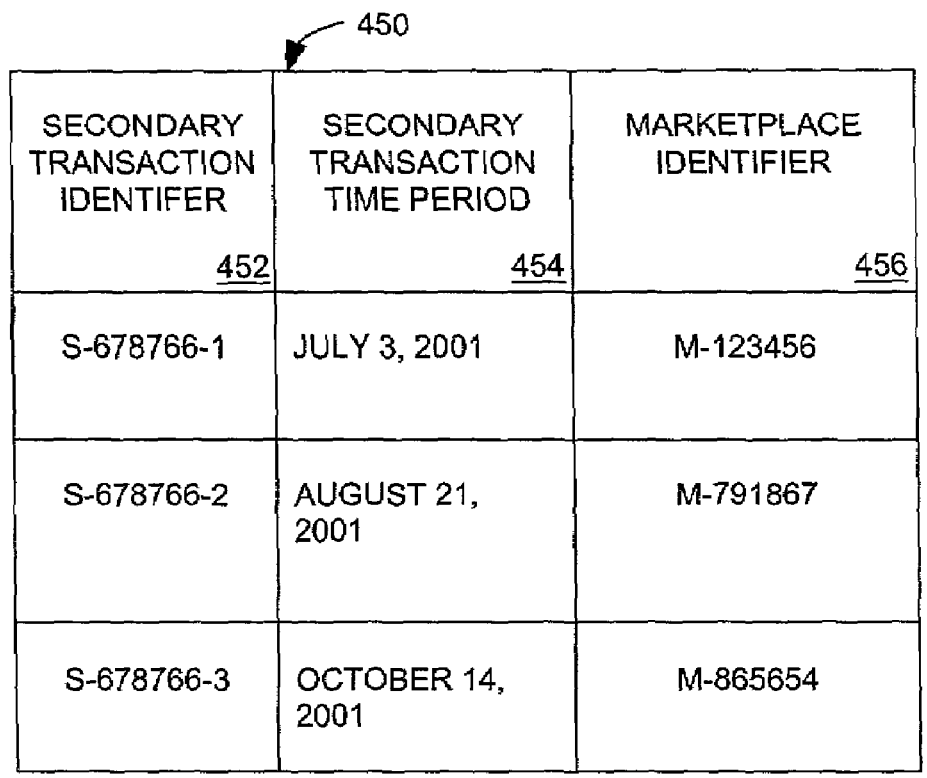
FIG. 8 is an illustration of a representative secondary transaction database usable with the transaction database of FIG. 7.

In some embodiments, a server, user device, or other device also may include or access a secondary transaction database for storing or keeping information about the secondary transactions listed in the transactions database 400. One representative secondary transaction database 450 is illustrated in FIG. 8. The secondary transaction database 450 may be included in or be part of the transaction database 400 or stand alone as a separate database.

The secondary transaction database 450 may include a secondary transactions identifier field 452 that may include codes or identifiers for one or more secondary transactions, a secondary transaction time period field 454 that may include information regarding when the secondary transactions identified in the field 450 will occur, and a marketplace identifier field 456 that may include information identifying marketplaces regarding where the secondary transactions identified in the field 452 will occur. Other or different fields also may be used in the secondary transactions database 450. For example, the secondary transactions database 450 may include a field identifying one or more entities involved in each secondary transactions identified in the field 452.

As illustrated in the representative secondary transactions database 450 of FIG. 8, the secondary transaction identified as "S-678766-1" in the field 452 will occur on Jul. 3, 2001, at the marketplace identified as "M-123456". The secondary transaction identified as "S-678766-2" in the field 452 will occur on Aug. 21, 2001, at the marketplace identified as "M-791867". The secondary transaction identified as "S-678766-3" in the field 452 will occur on Oct. 14, 2001, at the marketplace identified as "M-865654". Thus, the secondary transactions identified as "S-678766-1", "S-678766-1" and "S-678766-3" will occur instead of the transaction identified as "T-678766" in the field 402 of the transaction database 400 illustrated in FIG. 7 and each of the three secondary transactions "S-678766-1", "S-678766-2" and "S-678766-3" occur within the time period indicated in the field 406 for the transaction "T-678766". For sake of brevity of explanation, not all of the secondary transactions identified in the field 408 of the transaction database 400 of FIG. 7 are listed in FIG. 8.

As previously discussed above, in some embodiments a server, user device, or other device may include or access a marketplace database for storing or keeping information regarding one or more marketplaces. One representative marketplace database 500 is illustrated in FIG. 9.

The marketplace database 500 may include a marketplace identifier field 502 that may include codes or other identifiers for one or more marketplaces, a marketplace name/description field 504 that may include names, descriptions and other information for the marketplaces identified in the field 502, and a marketplace communication information field 506 that may include information regarding how to contract or communicate with the marketplaces identified in the field 506. Other or different fields also may be used in the marketplace database 500. For example, the marketplace database 500 may include fields that include information regarding terms and conditions required by the marketplaces identified in the field 502, fields that include information regarding the hours of availability of the marketplaces identified in the field 502, etc.

As illustrated in the representative marketplace database 500 of FIG. 9, the marketplace identified as "M-123456" in the field 502 is named "HARDWARE ONLINE SHOWCASE". Communication with the marketplace "M-123456" can occur by sending an email message to "SELLER@HOS.ORG" as indicated in the field 506.

As previously discussed above, in some embodiments a server, user device, or other device may include or access a product database for storing or keeping information regarding one or more products. One representative product database 600 is illustrated in FIG. 10.

The product database 600 may include a product identifier field 602 that may include codes or other identifying information regarding one or more products, a product name/description field 604 that may include name, descriptions and other information for the products identified in the field 602, and a marketplace identifier field 606 that may include information identifying one or more marketplaces where the products identified in the field 602 can be found, bought, sold, etc. Other or different fields also may be used in the product database 600.

Figure 10:
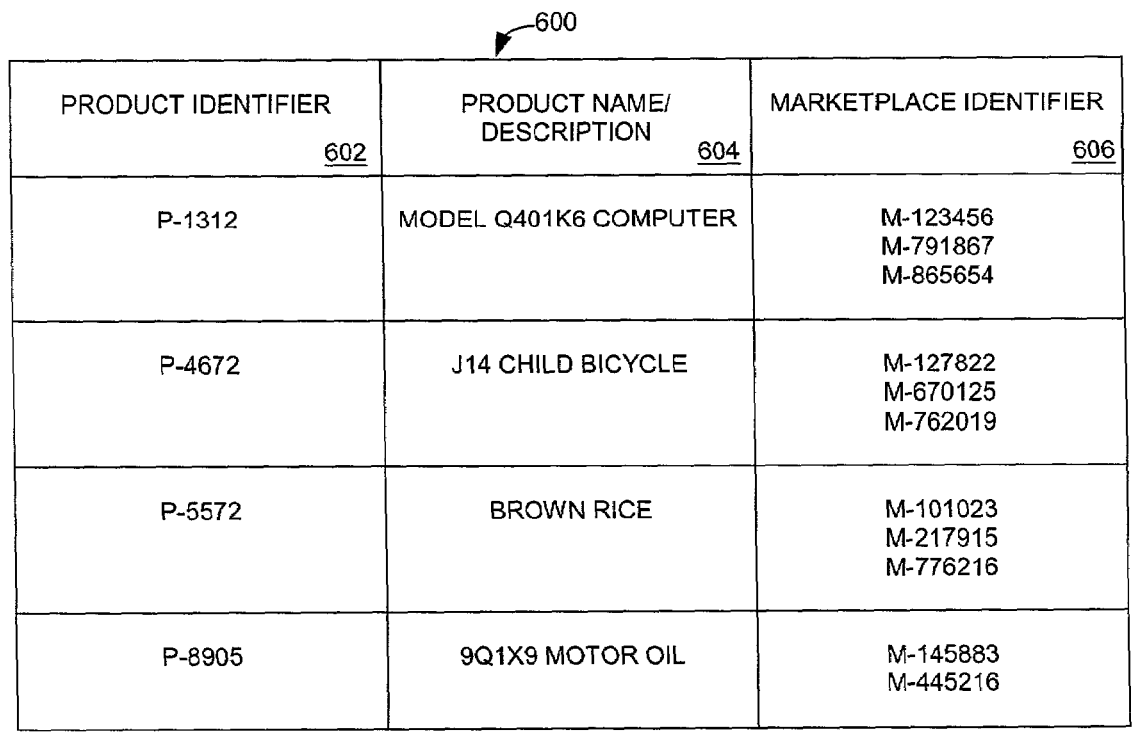
FIG. 10 is an illustration of a representative product database usable with the servers and user devices of FIG. 4 and the method of FIGS. 1–3.

As illustrated in the representative product database 600 of FIG. 10, the product identified as "P-1312" in the field 602 is a "MODEL Q401K6 COMPUTER" and can be found at, bought at, and/or sold at the marketplaces identified as "M-123456", "M791867" and "M-865654".

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Each of the methods disclosed herein may be used in many different industries, including, but not limited to, the semiconductor, automotive, electronics, data processing, mining, chemical, petroleum, aerospace, plastics manufacturing, medical device and technologies, consumer, food processing, and commodities industries. In some embodiments, one or more of the methods disclosed herein may be limited to use with certain kinds or types of products (e.g., non-financial products, dynamically price products, semiconductor products).

Although the present invention has been described with respect to a preferred embodiment thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A method for facilitating a transaction, comprising:
   receiving at a server computer via a communication network data indicative of an initial transaction involving a total quantity of a product, wherein said initial transaction is required to occur within a time period, said time period defined by a start date and an end date, said data including information regarding a total price associated with said initial transaction, said data including information regarding a marketplace where said product is available, said data including information regarding delivery of said product, said data including an identifier associated with said initial transaction, said data including an identifier associated with said product, said product being a physical product;
   determining a minimum order for said product at a marketplace;
   associating a plurality of secondary transactions with said initial transaction, wherein each of said secondary transactions is required to occur within said time period, one of said secondary transactions for execution at said marketplace for which said minimum order was determined, another one of said secondary transactions for execution at a marketplace that is different from said marketplace for which said minimum order was determined, each of said secondary transactions being determined based on a market impact of said initial transaction and on a market impact of said each secondary transaction on a respective marketplace at which said each secondary transaction is to be executed, said associating including allocating said total quantity of said product among said plurality of secondary transactions based on anticipated market impact of each of said secondary transactions on a price of said product at each of a plurality of marketplaces and based on delivery requirements and shipping times for said product;
   providing to another server computer via said communication network data indicative of each one of said plurality of secondary transactions;

determining a fee associated with said plurality of secondary transactions, said fee based on a number of marketplaces involved in said plurality of secondary transactions;

providing to said another server computer via said communication network data indicative of said fee; and using at least one of said server computers to execute said plurality of secondary transactions after said start date and before said end date.

* * * * *